(No Model.)  M. H. PEARSON.  6 Sheets—Sheet 1.
SEWING MACHINE.

No. 278,592.  Patented May 29, 1883.

Witnesses
H. Irwin
Jos. L. Marion

Inventor
Marshall H. Pearson
By his attorney
Charles G. C. Simpson (No Model.)
6 Sheets—Sheet 2.
M. H. PEARSON.
SEWING MACHINE.
No. 278,592. Patented May 29, 1883.
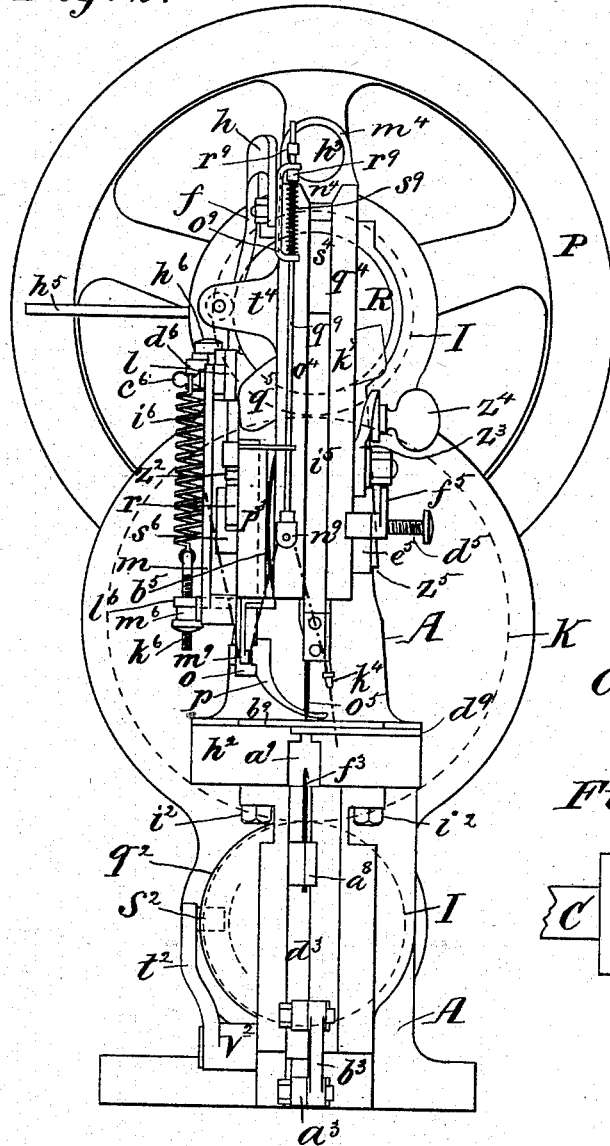
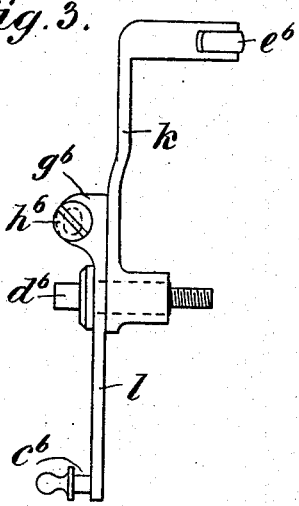
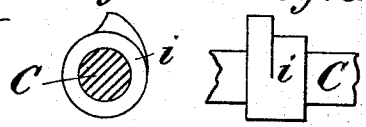
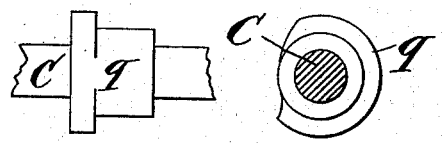
Witnesses
H. Irwin
Jos. Marien
Inventor
Marshall H. Pearson
By his Attorney
Charles G. C. Simpson (No Model.) 6 Sheets—Sheet 3.
M. H. PEARSON.
SEWING MACHINE.
No. 278,592. Patented May 29, 1883.
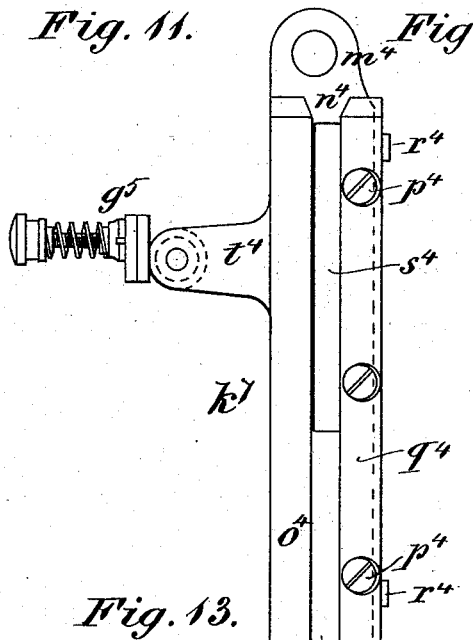
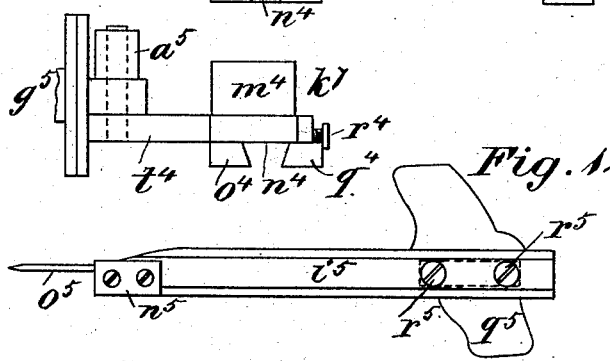
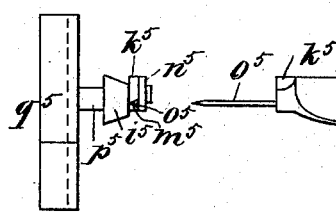
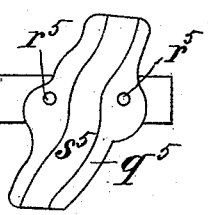
Witnesses
Inventor.
Marshall H. Pearson
By his Attorney
Charles G. C. Simpson (No Model.)  M. H. PEARSON.  6 Sheets—Sheet 4.
SEWING MACHINE.
No. 278,592.  Patented May 29, 1883.
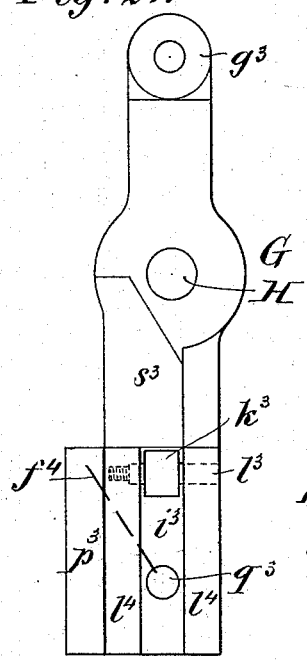
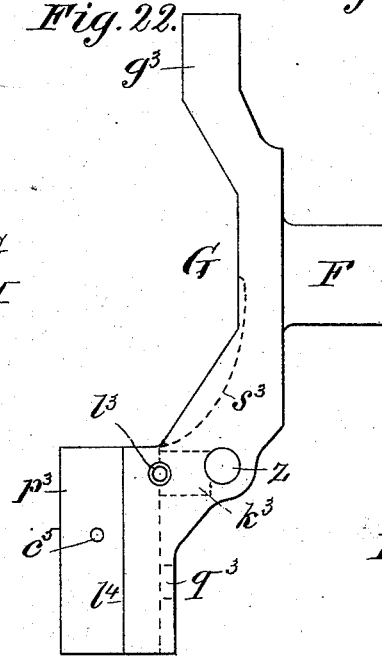
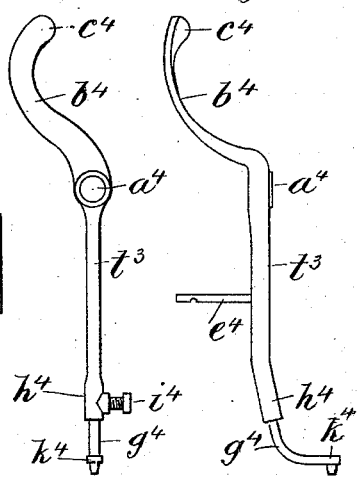
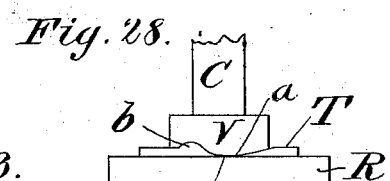
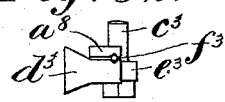
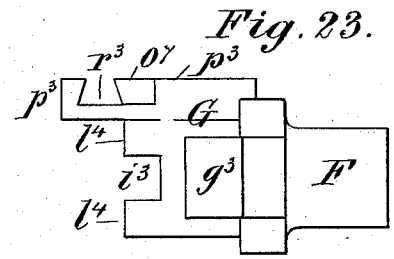
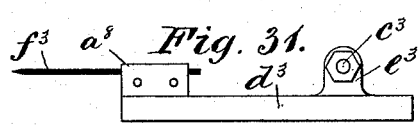
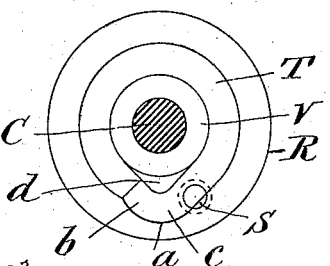
Witnesses
H. Irwin
Jos. H. Harrew
Inventor
Marshall H. Pearson
By his Attorney
Charles G. C. Simpson (No Model.)
6 Sheets—Sheet 5.
M. H. PEARSON.
SEWING MACHINE.
No. 278,592.  Patented May 29, 1883.
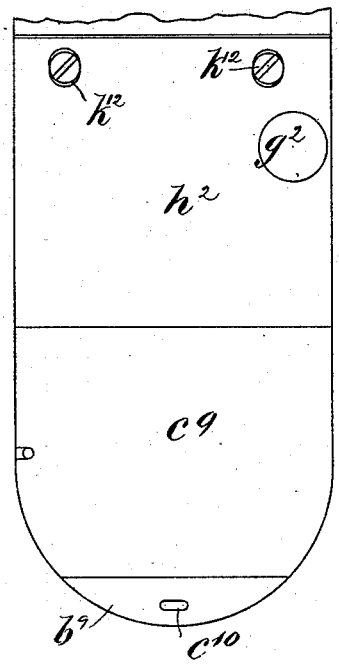
Fig. 33.
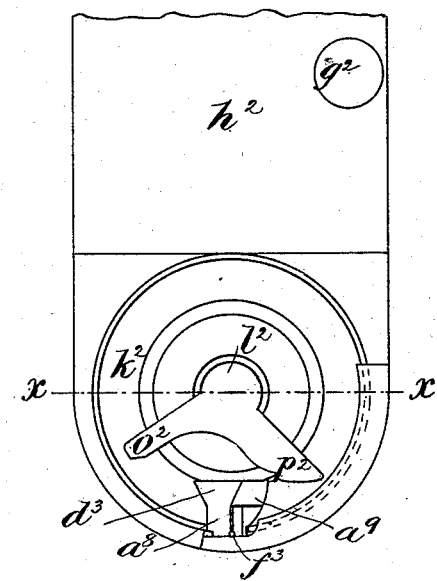
Fig. 34.
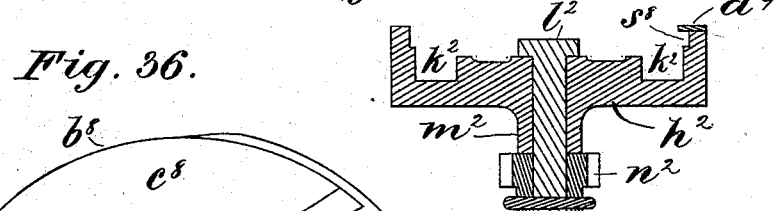
Fig. 35.
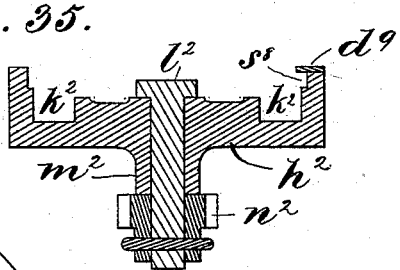
Fig. 36.
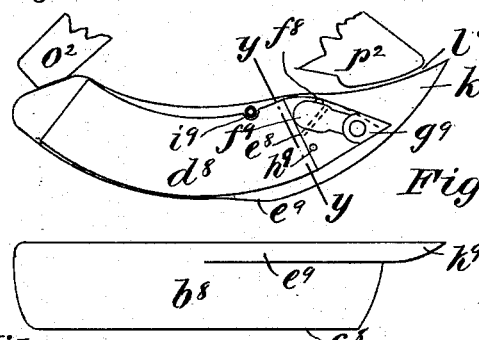
Fig. 37.
Fig. 38.
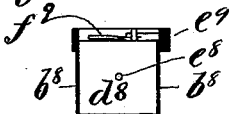
Fig. 39.
Fig. 40.
Witnesses
H. Irwin
Josh Marien
Inventor
Marshall H. Pearson
By his Attorney
Charles G. C. Simpson (No Model.) 6 Sheets—Sheet 6.
M. H. PEARSON.
SEWING MACHINE.

No. 278,592. Patented May 29, 1883.

Witnesses
J. H. Beaudry
A. Thomas

Inventor
Marshall H. Pearson
By his Attorney
Charles G. C. Simpson

UNITED STATES PATENT OFFICE.

MARSHALL HENRY PEARSON, OF LEEDS, COUNTY OF YORK, ENGLAND, ASSIGNOR TO JOHN O'FLAHERTY, OF MONTREAL, CANADA.

SEWING-MACHINE.

SPECIFICATION forming part of Letters Patent No. 278,592, dated May 29, 1883.

Application filed January 22, 1882. (No model.) Patented in England January 18, 1882, No. 255.

*To all whom it may concern:*

Be it known that I, MARSHALL HENRY PEARSON, of Leeds, in the county of York, in that part of the Kingdom of Great Britain called England, have invented certain new and useful Improvements in Sewing-Machines; and I do hereby declare that the following is a full, clear, and exact description of the same.

This invention has reference to the construction and arrangement of a sewing-machine more especially adapted for stitching leather with waxed threads; but the invention may also be used without waxing the threads, if desired, and may be used to stitch materials other than leather, the machine being adapted rather more for heavy than light work, although it is capable of doing the latter.

The improvements in sewing-machines forming the subject of the present application or invention will be fully set forth and claimed in the following description and claims.

Figure 1:
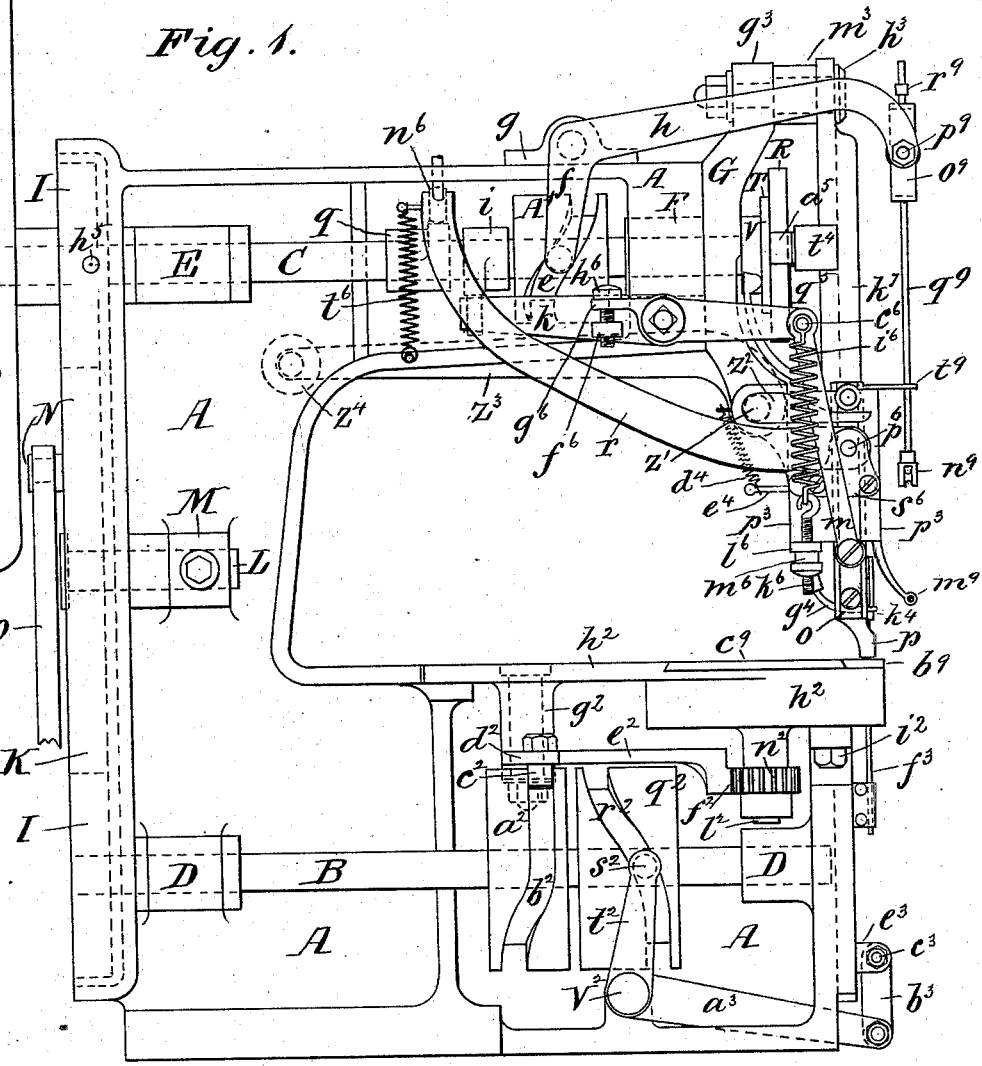
Figure 41:
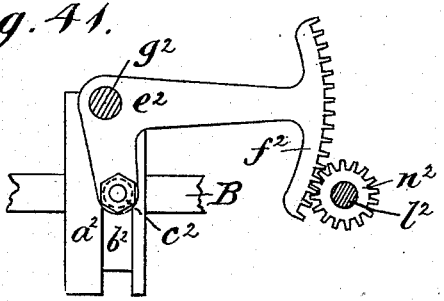

In the drawings hereunto annexed similar letters of reference indicate like parts, and Figure 1 is a side elevation of the general arrangement of a machine embodying my invention, and showing the parts of the machine in their proper relative position. Fig. 2 is a front elevation of Fig. 1. Fig. 3 is a plan of the levers by which the presser-bar and presser-foot are operated and adjusted. Fig. 4 is a front view of cam by which the levers shown in Fig. 3 are operated. Fig. 5 is a side elevation of Fig. 4. Fig. 6 is a front view of the cam by which the lever for retaining the presser-bar and presser-foot is operated. Fig. 7 is a side elevation of the cam shown in Fig. 6. Fig. 8 is a front elevation of the end of the lever by which the presser-bar and presser-foot are retained. Fig. 9 is an end elevation of Fig. 8. Fig. 10 is a rear elevation of Figs. 8 and 9. Fig. 11 is a front elevation of the swinging arm which guides and supports the slide carrying the awl, showing also the tension. Fig. 12 is a side elevation of Fig. 11. Fig. 13 is a plan of Fig. 11. Fig. 14 is a front elevation of the slide in which is secured the awl, being the slide received within and guided by the swinging arm. Fig. 15 is a back elevation of slide shown in Fig. 14. Fig. 16 is a plan of Fig. 14. Fig. 17 is a side bar to which the presser-foot is attached. Fig. 18 is a front elevation of Fig. 17. Fig. 19 is a plan of Fig. 17. Fig. 20 is a front elevation of the cam-disk by which the swinging arm is operated, also showing the crank-pin by which the slide carrying the awl is moved up and down in the said swinging arm. Fig. 21 is a front view of the adjustable head to which the swinging arm and other parts, as will be hereinafter described, are attached. Fig. 22 is a side elevation of Fig. 21. Fig. 23 is a plan of Fig. 21. Fig. 24 is a front view of the pin and die by which the looping-lever is carried. Fig. 25 is a side elevation of Fig. 24. Fig. 26 is a front view of the looper-lever. Fig. 27 is a side elevation of Fig. 26. Fig. 28 is a plan of Fig. 20, showing the cam projections by which the looper-lever is operated. Fig. 29 is a back elevation of Fig. 20, showing the cam projections by which the looper-lever is operated. Fig. 30 is a front elevation of the slide by which the hook is carried and operated. Fig. 31 is a side elevation of Fig. 30. Fig. 32 is a plan of Fig. 30. Fig. 33 is a plan of needle-plate, sewing-plate, and sub-frame, in which sub-frame the shuttle is carried. Fig. 34 is Fig. 33 reproduced with needle-plate and sewing-plate removed, also shuttle removed. Fig. 35 is a cross-section of Fig. 34 on line $x\,x$. Fig. 36 is a plan of the shuttle inverted. Fig. 37 is a plan of the shuttle right side up. Fig. 38 is a side elevation of shuttle. Fig. 39 is a cross-section on line $y\,y$, Fig. 37. Fig. 40 is a view showing the action, the looper with the needle or hook. Fig. 41 is a plan of the parts situated below the sub-frame by which the shuttle is actuated.

Letter A is the frame-work for holding the working parts in their proper relative positions.

B is the lower main driving-shaft, and C the upper main driving-shaft, B being carried in bearings D D, and C in bearing E and neck F, of the adjustable head G. This adjustable head is shown more particularly in Figs. 21, 22, and 23.

In the front upper end of the frame A a hole is bored out to fit and receive within it the neck F, so that by this arrangement the adjustable head G may be adjusted to set it farther forward or backward by passing the neck F farther in or farther out of the said opening in A, which receives it, and the adjustable head may also be adjusted by turning it upon F, as on a pivot, to set it longitudinally vertical or adjust it to a slight inclination, if desired. Through the neck F a hole, H, is bored, forming the aforesaid front bearing of the shaft C. As shown by dotted lines in Figs. 1 and 2, on the ends of these shafts B and C are secured—one on each—a gear-wheel, I, both of which intermesh with an intermediate gear-wheel, K, which revolves on a pivot, L, secured in a socket, M, formed on the frame A. The gear-wheel K is revolved by means of a crank-pin, N, and connecting-rod O, operated by any desired and suitable ordinary means; or power may be applied to K or attachment thereof in any ordinary manner to cause it to revolve. The gear-wheels I being equal, the shafts B and C are caused to revolve equally by the gear-wheel K. P is a fly-wheel, which may be used to give momentum to the working parts.

On the front end of the shaft C is secured a cam-disk, R, the general outline only of which is shown in Figs. 1 and 2; but its configuration is more particularly shown in Figs. 20, 28, and 29. The front face of R is flat, having a crank-pin and roller S (the roller being carried on the said crank-pin) set upon it. The periphery slightly deviates from a true circle, as shown by the dotted line in Fig. 20, which indicates the true circle. By this deviation of the periphery the swinging arm is operated to give it the feed motion required, all of which will be hereinafter described. On the back side of R are formed two projections, T and V. The projection T is provided with a peripheral projection, $a$, and surface-projection $b$, and surface-depression $c$. The projection B is provided with a peripheral projection, $d$, only, and by this peculiar formation of the back of the cam R the looper-lever, which will be hereinafter described, is operated.

On the shaft C is secured the cylinder A', provided with a cam-groove, $e$, with which a pin of the arm $f$ engages. This arm is in the ordinary way made in one with a pivot or journal carried in the bearing $g$, so that by the revolutions of the cylinder A' the cam-groove $e$ causes the arm $f$ to vibrate, as also the take-up lever $h$, which is made in one with the arm $f$. A further description of this lever will be hereinafter given.

$i$ is a cam secured upon the shaft C, for operating the levers $k$ and $l$, which, by means of the connecting-link $m$ and spring $i^6$, operates the slide-bar $o$, to which the presser-foot $p$ is attached.

$q$ is a cam secured on the shaft C, by which the lever $r$ is operated. This lever by its peculiar construction is enabled to hold the presser-bar by friction at the required position of elevation, all of which will be hereinafter fully described.

On the shaft B is secured a cylinder, $a^2$, provided with a cam-groove, $b^2$, with which the pin $c^2$ of an arm or lever, $d^2$, engages. This arm or lever is made in one with a second arm or lever, $e^2$, having at its end a segmental toothed gear-rack, $f^2$. The two arms or levers $d^2$ and $e^2$ are made in one, forming a rather acute ordinary bell-crank, the whole of which will hereinafter, for shortness and clearness, be called the "bell-crank" $e^2$. This is provided with an eye which is pivoted on the center bearing or trunnion, $g^2$. The said bearing $g^2$ is formed on a sub-frame, $h^2$, attached by screws $i^2$ and $k^{12}$, (see Figs. 1, 2, and 33,) to the frame A. The holes for these said screws are slightly elongated to allow of an amount of adjustment back and forward of the position of the said sub-frame. The front end of the sub-frame is provided with a circular recess, $k^2$, see Figs. 34 and 35, in which the segmental shuttle slides back and forth. The sub-frame is provided with a central opening and projection, $m^2$, in which the pin $l^2$ is fitted to rotate. On the lower end of the pin $l^2$ is secured a gear-wheel, $n^2$, which intermeshes with the segmental rack $f^2$, so that by the revolutions of the shaft B, and by means of the cylinder $a^2$ and cam-groove $b^2$, bell-crank $e^2$, and rack $f^2$, the pin $l^2$ is caused to turn on its axis about or a little more than a quarter of a revolution. The head of the pin $l^2$ is provided with two arms or projections, $o^2$ and $p^2$, which engage with the shuttle when it is in its place in the groove $k^2$, as shown in Fig. 37, one pushing the shuttle forward and the other driving it back. The position of the arms $o^2$ and $p^2$, as shown in Fig. 34, is that of about mid or half stroke.

$q^2$ is a cylinder, having a cam-groove, $r^2$, with which the pin $s^2$ of an arm, $t^2$, of a rock-shaft, $v^2$, engages. This rock-shaft is provided with a second arm, $a^3$, which is attached by a link, $b^3$, to the pin $c^3$, secured in a projection, $e^3$, of the slide $d^3$, which is guided in the front lower part of the frame A. In the said slide the hook or needle $f^3$ is held.

Having thus as above given a general statement or review of what the more important parts of the machine are, I will now give a more full and complete description of the construction and operation of them in so far as it may be necessary, together with a description of the lesser parts.

Beginning with the adjustable head G, and in addition to what has already been said on this part of the machine, I would state that its upper extremity is provided with an eye, $g^3$, to receive the pin $h^3$ by which the swinging arm is attached to it. (See Figs. 1, 2, 21, 22, and 23.) The lower part of the adjustable head G is provided with a groove, $i^3$, and a further recess, $k^3$, is formed within the body of G.

$l^3$ is a hole bored into the side of G, situated, as shown, in relation to the groove $i^3$ and recess $k^3$. This hole does not pass completely through G, but is reduced and screwed at the bottom end to receive the screw $m^3$. (Shown in Fig. 24.) To this screw is fitted a die, $n^3$, having a projection, $o^3$, so that when this die is in place its body projects into the recess $k^3$, while its projection $o^3$ sticks out in the groove $i^3$. It will be observed that $n^3$ is tapered so that it may have an amount of play in the recess $k^3$. On $o^3$ the looper-lever (see Figs. 26 and 27) is placed.

$q^3$ is an opening for a projection of the looper-lever to pass through. One side of G has a further projection, $p^3$, in which is formed a guide, $p^3$, for the presser-foot bar O.

$s^3$ is a depression or cutting away of the body of G to give room for the upper extension of the looper-lever. The contour of this is shown by the dotted curved line $S^3$ in Fig. 22.

Z is an opening to receive within it a rock-shaft, $Z'$, having at one end the arm $Z^2$, and to its other end is secured the lever $Z^3$, the use of which parts will be hereinafter described.

The looper-lever $t^3$ is shown in Figs. 26 and 27. It consists of an eye, $a^4$, which is fitted to the projection $o^3$, Fig. 25, so that by the turning of the eye $a^4$ on this projection and by the turning of the die $n^3$ on the pin $m^3$ the lever $t^3$ is able to move about in a limited degree as if it were sustained in place by a ball and socket or universal joint.

$b^4$ is an upper arm or extension, which terminates in a knob, $C^4$. This is caused to press upon and against the projections T and V by a spiral spring, $d^4$, attached to the projection $e^4$, which passes through the opening $q^3$. This will be understood by an examination of the relative position of the parts shown in Fig. 1 and the detail figures. The other end of the spring $d^4$ is attached to a stationary projection on G in such a position that the spring is situated diagonally, as indicated by the dotted line $f^4$, Fig. 21. This causes the arm and knob of the looper-lever to press not only forward upon the surface of T, but also against the periphery of V, so that a corresponding vibration of the lever $t^3$ is caused by the hereinbefore-described configuration of T and V, as shown in Figs. 28 and 29. This causes the end of the lever to perform a motion somewhat in the form of a circle or ellipse at each revolution of the shaft C and disk R. The lower end of the lever $t^3$ terminates in a socket, $h^4$, and screw $i^4$, to receive within it an extension, $g^4$, provided with an eye, $k^4$, for the upper or needle thread to pass through, so that this thread is by $k^4$ cast round the hook or needle $f^3$ at every revolution, the parts being timed to do this when $f^3$ is raised, as shown in Fig. 40.

As hereinbefore stated, the swinging arm $k^7$ is attached by a pin, $h^3$, to G. It swings close in front of the surfaces $l^4$ of the lower part of G. The construction of $k^7$ is shown by Figs. 11, 12, and 13. It consists of an eye, $m^4$, for the pin $h^3$ to pass through, and a bar, $n^4$, extending downward. This bar has upon it a longitudinal rib, $o^4$, which, with a supplementary piece, $q^4$, attached by screws $p^4$, form a dovetail groove for the awl-slide to be guided and move up and down in. The holes for the screws $p^4$ are elongated, and screws $r^4$ are provided for setting up and maintaining $q^4$ in position.

$s^4$ is a slot opening formed in $n^4$, and $t^4$ is a projection to which is pivoted a roller or pulley, $a^5$, which rolls upon the periphery of the cam or disk R and causes the arm $k^4$ to swing in the one direction, while the spring $b^5$, (see Fig. 2,) attached to $p^3$ by a screw inserted in the hole $c^5$, (see Fig. 22,) presses between the said part $p^3$ and swinging arm $k^7$ and causes it to swing in the other direction. This swing of the arm is so timed that it will take place when the awl-slide is down and the awl in the material to be stitched, and gives the feed required for the material to be moved forward for each stitch. That the length of the stitches may be adjusted as desired—for the cam configuration of the disk, as shown, (see Fig. 20,) gives the longest stitch to be made by the machine—a set-screw, $d^5$, attached by a bracket, $e^5$, is provided. By adjustment of this screw the swing of the arm $k^7$ will be reduced any desired amount, thereby adjusting the length of the stitches. $f^5$ is a lock-nut on the screw $d^5$ for securing it in position.

$g^5$ is an ordinary tension attached on the end of $t^4$, between the plates of which the needle-thread is brought. There being nothing novel about it, it is not necessary to describe it further. This tension is left out in Figs. 1 and 2, because it would obstruct in some measure the illustration of those parts that require more particularly to be shown. The spool having the needle-thread upon it is placed upon the spindle $h^5$.

The awl-slide, which is guided by the swinging arm $k^4$, is shown in Figs. 14, 15, and 16. It consists of a bar, $i^5$, configurated to fit the dovetail formed by $o^4$ and $q^4$. At its lower extremity it has a projection, $k^5$. In this is formed a V-shaped groove, $m^5$, situated longitudinally with the bar $i^5$. This, with the cover $n^5$, attached by screws, as shown, forms a clamp by which the awl $o^5$ is secured to the said bar.

To the back of $i^5$ is attached a neck, $p^5$, of suitable width to slide freely in the slot $s^4$. (See Fig. 11.) The depth of this neck is shown by the dotted lines in Fig. 14. The length of the neck is a very small amount greater than the thickness of the swinging bar $n^4$, so that a block, $q^5$, may be attached on the neck and move up and down with the bar without touching the back of the bar $n^4$, for it will be easily understood that when the bar $i^5$ is placed in position between the guides $o^4$ and $q^4$, and the neck $p^5$ placed on the back of it, and the block $q^5$ placed on the neck, the said block will be at the back of $n^4$. These three parts, $i^5$, $p^5$, and $q^5$, are united together by screws $r^5$, which pass through the three, as shown, and ordinary steady-pins may be further used to prevent any change of position, if desired.

Although, as above stated, the three justmentioned parts are described as separate, yet $p^5$ and $q^5$ could be made in one, if desired, or $i^5$ and $p^5$ may be made in one, if desired; but this last-mentioned construction would give greater trouble when these parts of the machine have to be taken asunder and put together.

In $q^5$ a compound curved groove, $s^5$, is formed of such depth and width as to fit the crank-pin and roller S of the disk R. The cross-section of this groove is rectangular.

From the above it will be seen that, as the disk R and crank-pin S revolve on the axis of the shaft C, the slide $i^5$ is caused to move up and down vertically the amount of the diameter of the circle described by the center of the crank-pin S, and that the said crank-pin travels in the groove an equal horizontal amount. Therefore, a certain amount of timing or adjustment of the speed of the vertical up and down strokes of the bar $i^5$ is obtained by the peculiar set and configuration of the groove $s^5$.

Having now described the construction and operation of the mechanism by which the awl is operated, I will now describe that for the presser-foot.

As hereinbefore stated, the presser-foot is attached on the slide-bar, O Figs. 17, 18, and 19. This slides and is guided in the projection $p^3$ and $o^7$ on G, Figs. 21 and 23. The bar O is provided with a journal, $t^5$, screwed into it, by which the lower end of the connecting-link $m$ is attached to it. A slotted opening, $a^6$, is formed in its body, and it is provided with a pin and roller, $b^6$, at the top, as shown. The upper end of the link $m$ connects with a screwed journal-pin, $c^6$, Figs. 1, 2, and 3, screwed into the end of the lever $l$, which lever is pivoted on the journal-pin $d^6$, screwed into the frame A in the position shown. On this pin is also pivoted the lever $k$, provided with a projection, in which is secured a roller, $e^6$, to engage with the cam $i$, which operates these levers. The levers $l$ and $k$ being separate, the one would not operate the other unless a connection were made between them, and this connection must be an adjustable one to cause the bar O and presser-foot $p$ to work at a higher or lower level as required for different thicknesses of material to be stitched by the machine. The said adjustable connection of the said levers is obtained by providing the lever $k$ with an eye, $f^6$, and the lever $l$ with a lug, $g^6$. The eye $f^6$ has a screwed opening fitted to agree with the thread of a screwed pin, $h^6$. To prevent the screw from being journaled in the opening in $g^6$ through which it passes, this opening is elongated the required amount for that purpose, as indicated by dotted lines in Fig. 3.

To keep the presser-foot down and the pulley $e^6$ pressed upon the periphery of the cam $i$, a powerful spring, $i^6$, is provided. This has its upper end placed upon the outer projection of the pin $c^6$, and lower end attached to the hook of a screwed spindle, $k^6$, which passes through a projection, $l^6$, attached on the under side of $p^3$, a thumb-nut, $m^6$, being provided, by which the tension of the spring may be adjusted.

In addition to moving the bar O and presser-foot up and down, as above described, it is desirable that it should be held in position during the time that the awl is being withdrawn from the material being stitched by a further mechanism, which grips the bar in position, and thus prevents the upward pull of the awl from overcoming the tension of the spring $i^6$, for should this take place the awl might not be drawn out clear of the material at the required time.

To enable the presser-foot to be readily raised by hand when the machine is stationary, the arm $Z^2$, rock-shaft $Z'$, and lever $Z^3$ are provided, (see Figs. 1 and 2,) and that the presser-foot may remain raised without holding the handle $Z^4$ by the hand all the time, a notch, $Z^5$, is cut in the side of the frame A to engage the lever $Z^3$ with. Any desirable ordinary means being provided—such as a notch or spiral spring—for holding the lever $Z^3$ in a raised position when it is not desired to act upon the presser-foot.

As already mentioned, the mechanism to secure the presser-foot consists of the cam $q$ and lever $r$, Figs. 1 and 2, which is provided with a roller, $n^6$, at its upper extremity, which, in the ordinary way, engages with the said cam. The lower extremity of the lever is provided with a journal, $p^6$, on its front side, and on its back side with a flat projection, $q^6$, which, as shown in Figs. 9 and 17, is received within the slot $a^6$ of the bar O. The projection $q^6$ terminates in a journal, $r^6$. This is received within a suitable bearing or recess formed for it in $p^3$, (see Fig. 9,) while the outer journal, $p^6$, is carried in a bracket, $s^6$, attached on the front side of $p^3$, as shown in Figs. 1 and 2. Now, as shown in Fig. 17, the projection $q^6$ nearly fills the slot $a^6$, so that if the lever $r$ is turned a very small amount downward two of the edges of $q^6$ come with great force upon the surfaces of the slot and hold the bar O rigidly in position. The force with which the projection $q^6$ acts upon the bar O will be due to the amount of tension of the spring $t^6$, which keeps the roller $n^6$ pressed on the periphery of the cam $q$.

In addition to the hereinbefore-given description of the slide $d^3$, by which the hook or needle $f^3$ is carried, it only remains to say that a clamping device, $a^8$, is formed in connection with the bar $d^3$, by which the hook or needle is grasped. This is substantially the same as that fully described above for securing the awl. It will be observed that in the front part of the sub-frame $h^2$ an opening, $a^9$, is formed over the bar $d^3$.

$b^9$ is the needle-plate, having an opening, $c^{10}$, for the needle or hook $f^3$ and awl $o^5$ to pass through.

$c^9$ is the work-plate, or plate upon which the body of the work rests. Under a portion of these plates is secured the guard $d^9$ to form a

UNITED STATES PATENT OFFICE.

MARSHALL HENRY PEARSON, OF LEEDS, COUNTY OF YORK, ENGLAND, ASSIGNOR TO JOHN O'FLAHERTY, OF MONTREAL, CANADA.

SEWING-MACHINE.

SPECIFICATION forming part of Letters Patent No. 278,592, dated May 29, 1883.

Application filed January 22, 1882. (No model.) Patented in England January 18, 1882, No. 255.

*To all whom it may concern:*

Be it known that I, MARSHALL HENRY PEARSON, of Leeds, in the county of York, in that part of the Kingdom of Great Britain called England, have invented certain new and useful Improvements in Sewing-Machines; and I do hereby declare that the following is a full, clear, and exact description of the same.

This invention has reference to the construction and arrangement of a sewing-machine more especially adapted for stitching leather with waxed threads; but the invention may also be used without waxing the threads, if desired, and may be used to stitch materials other than leather, the machine being adapted rather more for heavy than light work, although it is capable of doing the latter.

The improvements in sewing-machines forming the subject of the present application or invention will be fully set forth and claimed in the following description and claims.

In the drawings hereunto annexed similar letters of reference indicate like parts, and Figure 1 is a side elevation of the general arrangement of a machine embodying my invention, and showing the parts of the machine in their proper relative position. Fig. 2 is a front elevation of Fig. 1. Fig. 3 is a plan of the levers by which the presser-bar and presser-foot are operated and adjusted. Fig. 4 is a front view of cam by which the levers shown in Fig. 3 are operated. Fig. 5 is a side elevation of Fig. 4. Fig. 6 is a front view of the cam by which the lever for retaining the presser-bar and presser-foot is operated. Fig. 7 is a side elevation of the cam shown in Fig. 6. Fig. 8 is a front elevation of the end of the lever by which the presser-bar and presser-foot are retained. Fig. 9 is an end elevation of Fig. 8. Fig. 10 is a rear elevation of Figs. 8 and 9. Fig. 11 is a front elevation of the swinging arm which guides and supports the slide carrying the awl, showing also the tension. Fig. 12 is a side elevation of Fig. 11. Fig. 13 is a plan of Fig. 11. Fig. 14 is a front elevation of the slide in which is secured the awl, being the slide received within and guided by the swinging arm. Fig. 15 is a back elevation of slide shown in Fig. 14. Fig. 16 is a plan of Fig. 14. Fig. 17 is a side bar to which the presser-foot is attached. Fig. 18 is a front elevation of Fig. 17. Fig. 19 is a plan of Fig. 17. Fig. 20 is a front elevation of the cam-disk by which the swinging arm is operated, also showing the crank-pin by which the slide carrying the awl is moved up and down in the said swinging arm. Fig. 21 is a front view of the adjustable head to which the swinging arm and other parts, as will be hereinafter described, are attached. Fig. 22 is a side elevation of Fig. 21. Fig. 23 is a plan of Fig. 21. Fig. 24 is a front view of the pin and die by which the looping-lever is carried. Fig. 25 is a side elevation of Fig. 24. Fig. 26 is a front view of the looper-lever. Fig. 27 is a side elevation of Fig. 26. Fig. 28 is a plan of Fig. 20, showing the cam projections by which the looper-lever is operated. Fig. 29 is a back elevation of Fig. 20, showing the cam projections by which the looper-lever is operated. Fig. 30 is a front elevation of the slide by which the hook is carried and operated. Fig. 31 is a side elevaion of Fig. 30. Fig. 32 is a plan of Fig. 30. Fig. 33 is a plan of needle-plate, sewing-plate, and sub-frame, in which sub-frame the shuttle is carried. Fig. 34 is Fig. 33 reproduced with needle-plate and sewing-plate removed, also shuttle removed. Fig. 35 is a cross-section of Fig. 34 on line *x x*. Fig. 36 is a plan of the shuttle inverted. Fig. 37 is a plan of the shuttle right side up. Fig. 38 is a side elevation of shuttle. Fig. 39 is a cross-section on line *y y*, Fig. 37. Fig. 40 is a view showing the action, the looper with the needle or hook. Fig. 41 is a plan of the parts situated below the sub-frame by which the shuttle is actuated.

Letter A is the frame-work for holding the working parts in their proper relative positions.

B is the lower main driving-shaft, and C the upper main driving-shaft, B being carried in bearings D D, and C in bearing E and neck F, of the adjustable head G. This adjustable head is shown more particularly in Figs. 21, 22, and 23.

In the front upper end of the frame A a hole is bored out to fit and receive within it the neck F, so that by this arrangement the adjustable The machine is heated in all parts requiring it in the ordinary way by gas-jets when hard-wax threads are used.

The shuttle will be provided with a cop of thread waxed or not, as desired.

What I claim, and wish to secure by Letters Patent, is as follows:

1. The combination of an adjustable sub-frame, $h^2$, having curved groove $k^2$, guard-plate $d^9$, needle-plate $b^9$, provided with opening $c^{10}$, with curved shuttle and needle or hook $f^3$, and pin $l^2$, having arms $o^2$ and $p^2$, substantially as described.

2. The combination of revolving cylinder having cam-groove $b^2$, bell-crank $e^2$, rack $f^2$, wheel $n^2$, pin $l^2$, having arms $o^2 p^2$, with an adjustable sub-frame having curved groove $k^2$, provided with a correspondingly-curved shuttle, the whole constructed and providing an adjustable shuttle, substantially as described.

3. The combination of the cam $i$, levers $k$ and $l$, having an adjustable connection with each other, as described, link $m$, spring $i^6$, presser-bar O, and presser-foot $p$, substantially as shown, and for the purposes set forth.

4. The combination of the cam $q$, spring $t^6$, lever $r$, having projection $q^6$, and bar O, provided with surfaces for the edges of the projection $q^6$ to act upon, substantially as shown and described.

5. The combination of the pin $m^3$ and die $n^3$, having projection $o^3$, with the looper-lever and with the cam-disk R, constructed as shown and described, substantially as set forth.

6. The combination of the cam-disk R, having pin S, swinging arm $k^7$, provided with roller $a^5$, slide $i^5$, holding the piercing and feeding awl, and block $q^5$, provided with groove $s^5$, the whole constructed, arranged, and operating substantially as described.

7. The combination of the take-up lever $h$, operated as described, bracket $o^9$, spiral spring $s^9$, adjustable stops $r^9$, and rod $q^9$, having eye $n^9$, substantially as described.

MARSHALL HENRY PEARSON.

Witnesses:
 WILLIAM J. GREEN,
 HENRY S. LEUTY,
Clerks to Messrs. Teale & Appleton, Solicitors, Leeds.